United States Patent

[11] 3,568,190

[72] Inventor Sam H. Wong
Yorba Linda, Calif.
[21] Appl. No. 748,066
[22] Filed July 26, 1968
[45] Patented Mar. 2, 1971
[73] Assignee North American Rockwell Corporation

[54] FULL MONOPULSE VARIABLE POLARIZATION FEED BRIDGE
8 Claims, 11 Drawing Figs.

[52] U.S. Cl. .................................................. 343/16
[51] Int. Cl. .................................................. G01s 9/22
[50] Field of Search ................................. 343/16, 165 (D), 16 (M)

[56] References Cited
UNITED STATES PATENTS

| | | | |
|---|---|---|---|
| 3,093,826 | 6/1963 | Fink | 343/16SD |
| 3,209,355 | 9/1965 | Livingston | 343/16UX |
| 3,259,899 | 7/1966 | Cook | 343/16UX |
| 3,274,604 | 9/1966 | Lewis | 343/16UX |
| 3,293,648 | 12/1966 | Kuhn | 343/16UX |
| 3,308,468 | 3/1967 | Hannan | 343/16UX |
| 3,344,424 | 9/1967 | Hacker | 343/16UX |
| 3,453,617 | 7/1969 | Begeman et al. | 343/16UX |

Primary Examiner—Rodney D. Bennett, Jr
Assistant Examiner—Malcolm F. Hubler
Attorneys—L. Lee Humphries and Edward Dugas ABSTRACT: The device of this invention is a monopulse microwave feed bridge for transmitting and receiving selected polarizations which is comprised of an ortholinear, full monopulse feed bridge having a pair of mutually orthogonal linear polarization monopulse sum ports and a set of dual-plane monopulse difference ports comprised of a first and second pair of mutually orthogonal linear polarization receiver ports. The phase at one port of each of the three pairs of ports is adjustable and a 3db hybrid coupler is interposed at each pair of ports. A waveguide switch cooperates with the summation channel 3db hybrid coupler and the variable phase shifter to selectively control and vary the polarization of the transmitted waves. The 3db hybrid couplers at the monopulse difference channel outputs and the adjustable monopulse difference channel phase shifters provide difference receiver responses to selected polarizations in a multimode system application. This particular configuration allows the selection of any particular type of transmitted polarized wave while simultaneously providing the capacity to selectively receive the transmitted polarization and its orthogonal polarizations. In a second embodiment of the invention, the 3db hybrid couplers are replaced by 3db hybrid switches to provide a linear polarization mode on transmit and receive.

INVENTOR.
SAM H. WONG
BY
ATTORNEY

INVENTOR.
SAM H. WONG
BY Edward Dugas
ATTORNEY

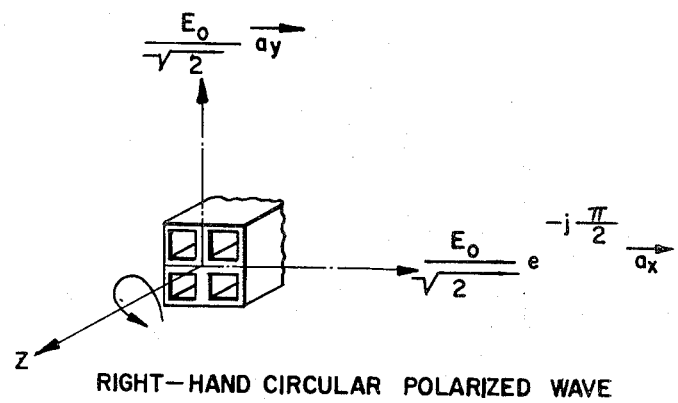
FIG. 5
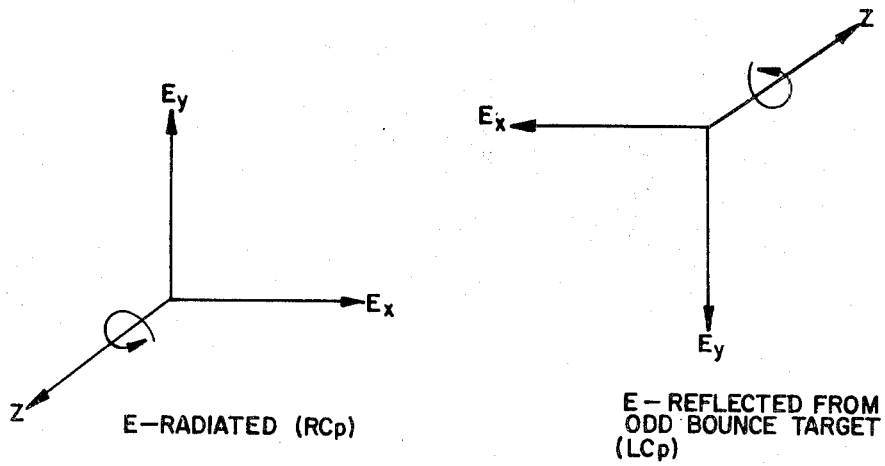
FIG. 6A
FIG. 6B
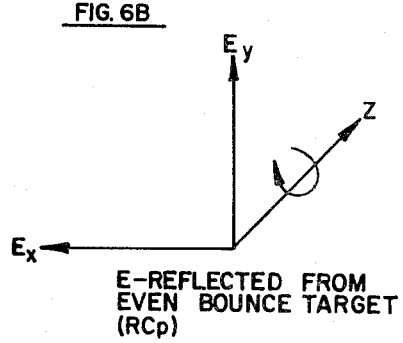
FIG. 6C
INVENTOR.
SAM H. WONG
BY Edward Dugas
ATTORNEY

FULL MONOPULSE VARIABLE POLARIZATION FEED BRIDGE

BACKGROUND OF THE INVENTION

This invention pertains to the field of monopulse radar systems and more particularly to an orthogonal variable polarization monopulse radar system.

Monopulse radar systems are used wherever precision direction finding capability is necessary. The direction of a target is determined by comparing the signals received on two or more antenna patterns simultaneously. The pulse feature of the radar is utilized to determine range as well as the angle of arrival. The angle of the target, with respect to the receiving antenna, is determined by comparing the signal receiver on two or more noncoincident substantially similar antenna patterns. The patterns are usually mere images, symmetrically spaced about an axis, called the boresight axis; the signals received by the antenna are equal when the target is on the boresight axis. When the signal is received simultaneously on two different antenna patterns, the absolute amplitudes and absolute phases of the received signals may vary with the changing characteristics of the source or of the propagation medium, but their relative values are functions only of the angle of arrival. In the simplest form, a comparison of a single pair of signals will be sufficient to determine the angle of arrival in a single plane such as, for example, the azimuth or elevation plane. Complete 3-dimensional tracking requires angle-arrival measurements in two orthogonal planes. Therefore, two pairs of signals are usually compared, one pair for the azimuth plane and the other for the elevation plane. Representative techniques for achieving dual-plane monopulse operations are disclosed in the book INTRODUCTION TO MONOPULSE authored by Donald R. Rhodes and published by McGraw Hill Book Company, 1959, pages 69 to 76. Disclosed therein is a monopulse system utilizing an array of four beams which are completely symmetrical about the boresight axis such that the right and left pairs of beams compare in azimuth and the upper and lower pairs of beams compare in elevation. In the receiving mode, the signals from all four beams are added in phase to produce a symmetrical sum pattern. Subtraction of the signals from the lower two apertures from those of the upper two apertures will result in an elevation difference signal, while subtracting signals of the two left-hand apertures from those of the two right-hand apertures will result in an azimuth difference signal. The dual-plane monopulse systems disclosed in this reference deal with lineally polarized transmission and received signals. It is also known in the prior art that the polarization angle of a received signal is a function of the surface quality of the target from which the transmitted signal has been scattered. A system capable of receiving and discriminating orthogonal polarizations, that is vertical, horizontal, elliptically, right circularly polarized and left circularly polarized signals simultaneously would have the advantage in that not only could the location of the target be determined accurately but information as to the surface qualities could simultaneously be determined.

In U.S. Pat. No. 3,037,204 entitled Trimode Turnstile Monopulse Feed by P. J. Allen et al., there is disclosed a trimode monopulse feed utilizing a turnstile junction. The trimode turnstile junction is connected to a suitable transducer for resolving the direction of polarization in the output of the junction. The conventional sum signal for the simultaneous lobing of the system is obtained from one terminal of the trimode turnstile junction, and the two difference signals in the right angularly related azimuth and elevation planes are resolved by a transducer for delivery as the azimuth error and elevation error signals which are normally employed by the conventional simultaneous lobing radar systems. The device disclosed by P. J. Allen et al. uses rectangular waveguides for the receive and transmit mode. Rectangular waveguides can only receive linearly polarized waves. The advantages or desired feature of receiving linear, elliptical, and circularly polarized waves cannot therefore be realized with this particular device. Most waveguides are of rectangular cross section having a 2:1 ratio between their broad and short wall; this ratio is termed the "aspect" ratio. In such a waveguide, the cutoff wave length for the dominate mode will be twice the broad-wall dimension. The cutoff wave length for the orthogonally related mode is equal to twice the short-wall dimension of such a waveguide. If it is desirable to support the orthogonally related modes in a single waveguide having equal cutoff modes, a square waveguide should be used. To interconnect various waveguides at a common junction, that is to interconnect rectangular waveguides to an orthogonal or square waveguide, it is common to use hybrid structures. A hybrid junction, commonly called a bridge, effects a division and isolation between certain of its waveguide ports, but such a junction is not capable of discerning circularly polarized information. Applicant's device has this feature.

Another prior art device is disclosed in U.S. Pat. No. 3,049,703 entitled Dual Polarization Signal Cancellation System by D. C. Davis. In that particular patent, the fact that the polarization characteristics of a desired signal is different from an interfering signal is used. The system uses two antennas arranged to have substantially vertical polarization on one antenna and linear horizontal polarization on the other. The received signals are differenced and the difference between them noted in light of the fact that the reflection of incident waves from objects of very simple geometric shapes does not change polarization. The majority of reflected waves then may be expected to exhibit a degree of signal depolarization. The reflection of incident waves from moving targets, such as aircraft, is usually considerably depolarized, particularly when incident waves strike at aspect angles where many nonsymmetrical surfaces contribute to the reflected wave. By selective filtering, it is possible to determine those signals which are fixed in point of time and those which are caused by sporadic fluctuations. Cancellation or minimizing of the undesired signals is achieved by averaging the return signal and utilizing this averaged signal as an AGC control signal to change the gain of the system to effectively cancel the interfering signal that is received at a particular polarization angle. This aforementioned system does not operate upon elliptically polarized waves nor does it have the capability of transmitting and receiving selected polarizations.

Another prior art device is disclosed in U.S. Pat. No. 3,359,555 entitled Polarization Diversity Monopulse Tracking Receiver by R. E. Taylor. In the device of that patent, the monopulse system derives the sum and difference signals for vertical and horizontal polarizations. The two derived signals are then used to control the phase of the difference signals. The antenna system of Taylor's particular patent is directed to a device wherein both linear and circular polarizations may be received. None of the prior art, however, is directed to a monopulse feed bridge means for transmitting selected polarizations and simultaneously receiving echoes of the transmitted polarizations and respective orthogonal polarizations.

SUMMARY OF THE INVENTION

In a preferred embodiment of this invention, there is provided a full monopulse feed bridge having a pair of mutually orthogonal linear polarization monopulse sum ports and two sets of dual-plane monopulse difference ports comprising a first and second pair of mutually orthogonal polarization difference receiver ports and a pair of mutually orthogonal summation ports. The phase at one port of each of the pairs of ports is adjustable and a 3db hybrid coupler is interposed in each pair of ports. By waveguide switch means cooperating with the hybrid coupler and by selectively varying an adjustable sum channel phase shifter, a variety of polarizations may be transmitted or selectively received. Controlling the hybrid couplers at the monopulse difference channel outputs and varying the adjustable monopulse difference channel phase shifters provide difference channel receiver responses to selected polarizations in a multimode system application. With the control of the relative amplitude and relative phase of the two orthogonal linear polarized waves, it is possible to generate a wave having any polarization state. A microwave transmitter is connected by means of a waveguide switch to a pair of circulators. The circulators either transmit signals to the ortholinear feed bridge while isolating the receiver from the transmitter; or in the receive mode, the circulators pass the received signals from the ortholinear receiver. The 3db hybrid switches in the open state behave like a 3db hybrid coupler which divides the electromagnetic wave energy into equal amplitudes with a $\pi/2$ relative phase difference.

Accordingly, it is an object of the present invention to provide an improved full monopulse variable polarization feed bridge which provides the capability of transmitting any selected polarization and simultaneously receives the transmitted polarization and its orthogonal polarization.

It is a further object of the present invention to provide a variable polarization full monopulse feed bridge.

It is another object of the present invention to provide a feed bridge for selectively receiving linear horizontal, elliptical, right circular, and left circular polarized waves, or any combination thereof.

It is a further object of the present invention to provide a feed bridge wherein the polarization state of the transmitted wave can be varied.

The aforementioned and other objects of the present invention will become more apparent when taken in conjunction with the following description and drawings, throughout which like characters indicate like parts, and which drawings form a part of this application.

BRIEF DESCRIPTION OF THE DRAWINGS

FIG. 5 is a vector diagram useful in understanding the invention;

FIGS. 6A, 6B and 6C are vector diagrams useful in understanding the invention.

BRIEF DESCRIPTION OF THE PREFERRED EMBODIMENTS

Figure 1:
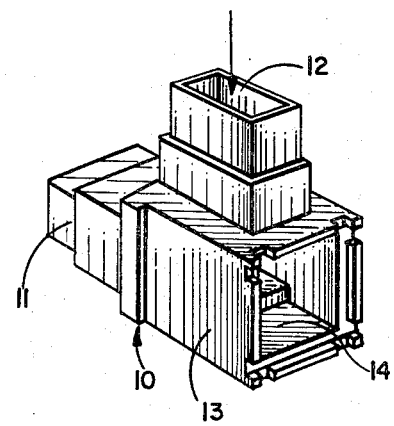
FIG. 1 illustrates in a perspective view an orthomode transducer.

Referring to FIG. 1, the orthomode transducer 10 is comprised of rectangular waveguides sections 11 and 12 and a square waveguide section 13 having a square exit aperture 14. The square waveguide section 13 is capable of supporting vertical and horizontally polarized waves along with elliptically polarized waves. The polarization angles of the electromagnetic waves passing through the waveguides 11 and 12 are mutually orthogonal to each other. If electromagnetic waves are simultaneously applied to the waveguide sections 11 and 12, they will arrive at the square waveguide 13, where the polarization state of the transmittal wave is dependent upon the relative phase shifts and amplitudes between the two waves. The converse holds true for received waves. The electromagnetic waves radiate from the aperture opening 14 having a polarization state which is dependent upon the relative amplitude and phase of two orthogonally polarized waves. The converse is also true of a wave which is received by the exit aperture 14. That is, it is divided into its relative linear components and fed in the correct proportion to waveguides 11 and 12.

Figure 2B:
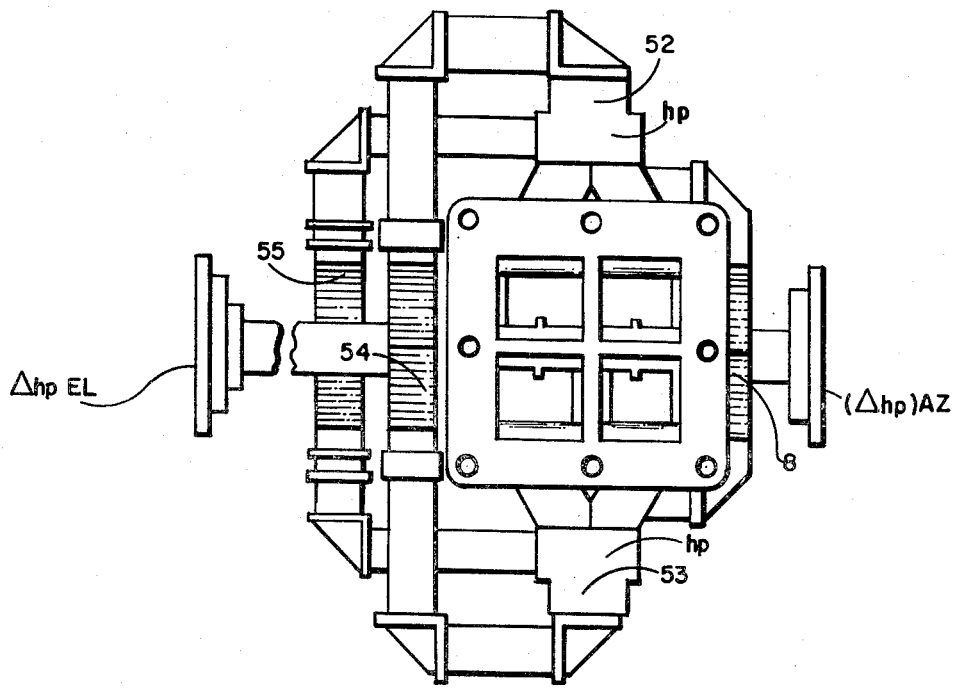
FIG. 2B is a front view of the feed bridge of FIG. 2A.
Figure 2A:
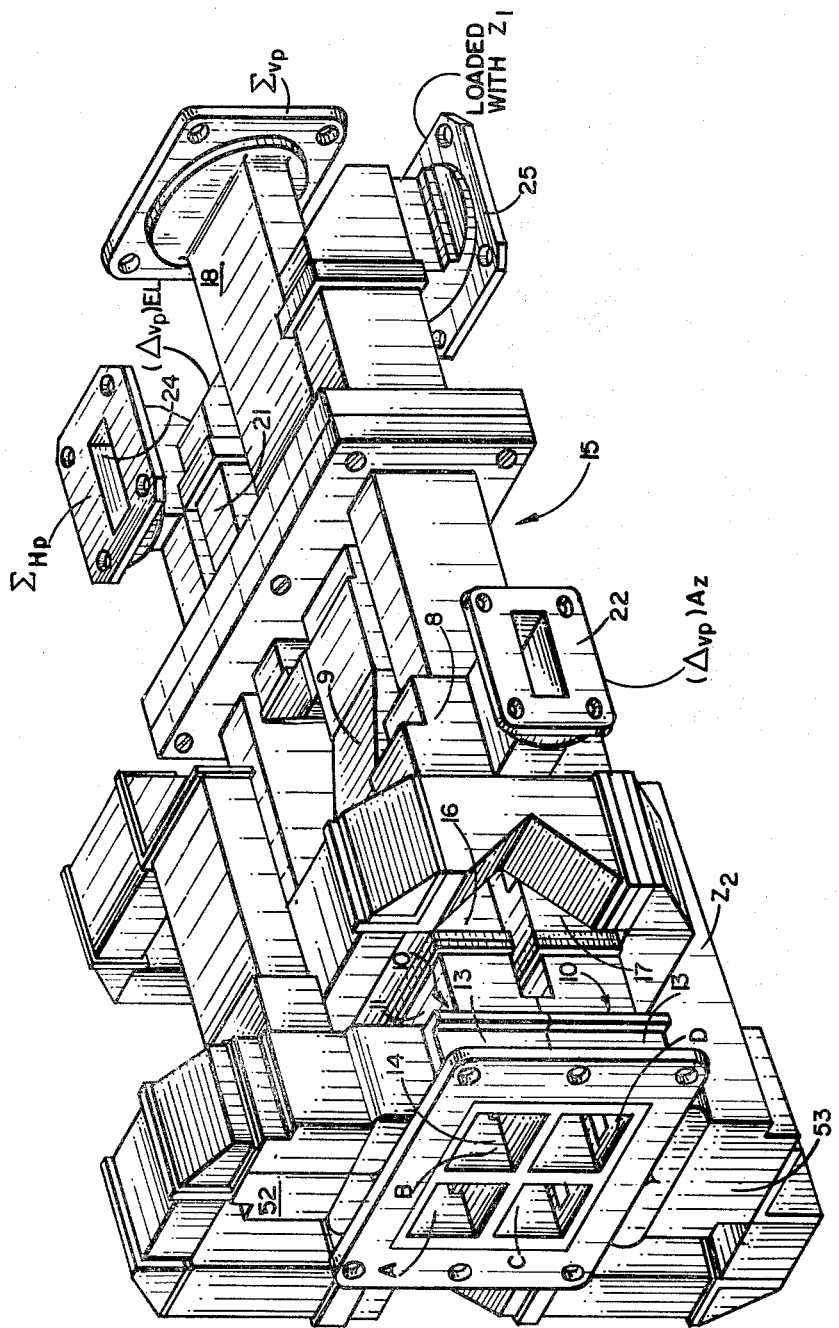
FIG. 2A is a perspective view of an ortholinear polarization monopulse feed bridge utilizing the transducer of FIG. 1 and magic tees.
Figure 3:
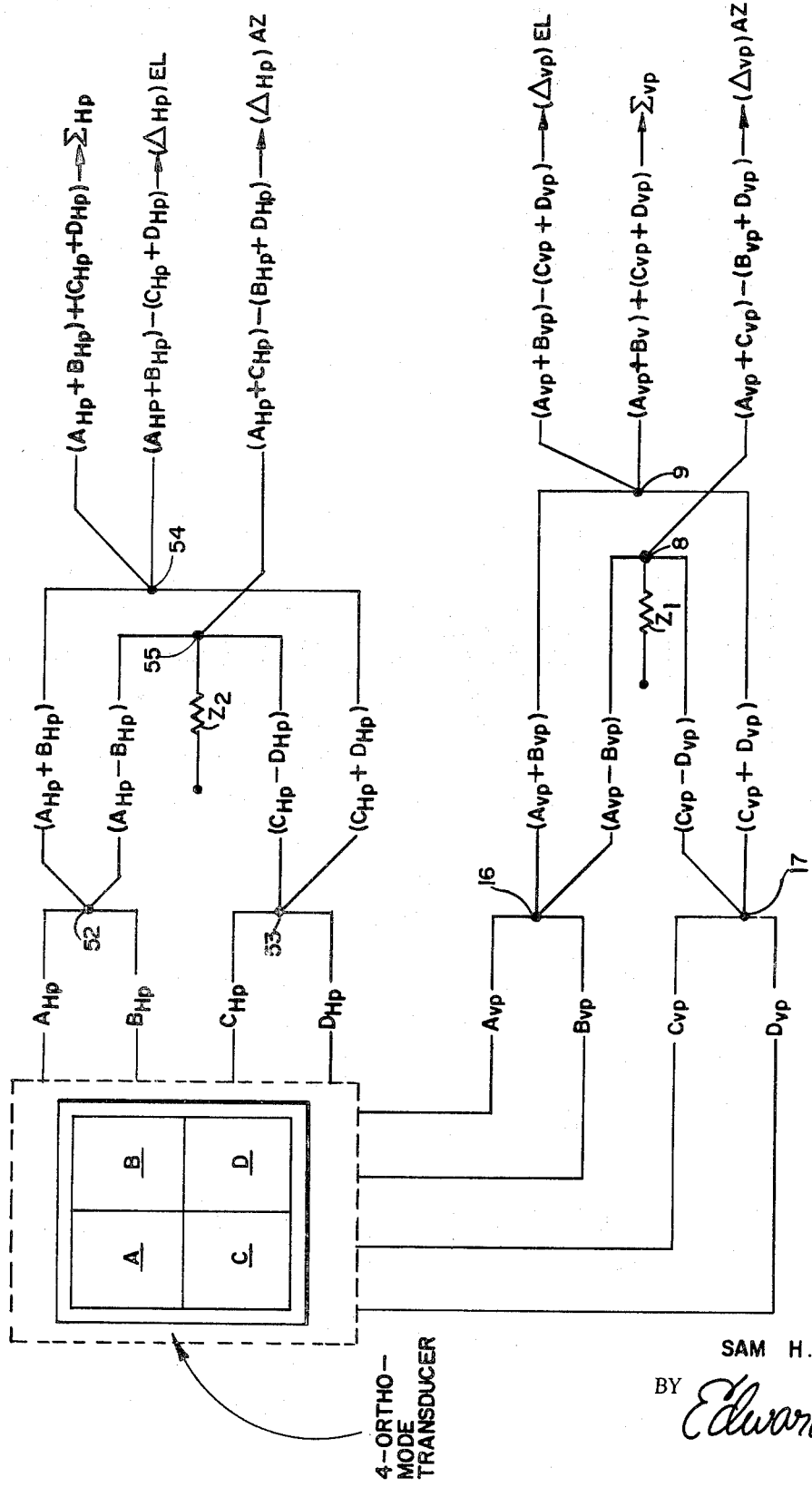
FIG. 3 is a schematic diagram of the ortholinear polarization monopulse feed bridge of the preceding FIGS.

Referring now to FIGS. 2A, 2B and 3 wherein there is shown four orthomode transducers 10 ganged together to form an ortholinear polarization monopulse feed bridge 15. In FIG. 3, the schematic diagram of the polarization feed bridge 15 shows the four transducer sections 10 labeled A, B, C, and D. The signals received from each of these sections will be designated by a capital letter for the respective transducer and subletters either HP or VP for horizontal polarized or vertical polarized waves respectively. The vertical polarized wave from the transducer A is summed with the vertical polarization wave from the transducer B in a magic-tee connector 16, providing at one output port of the magic-tee a summation signal and at another output port the difference signal. The C and D transducer vertical polarized waves are summed together in a like manner in the magic-tee connector 17 to provide a sum and a difference signal. The A, B, C, and D vertical polarized waves are summed together in the magic-tee 9 to give a vertical polarized summation $\Sigma_{VP}$ which is transmitted through waveguide section 18. The A and B vertical polarized signal is differenced in magic-tee 9 with respect to the vertical polarized sum signals of C and D to provide a $\Delta$ vertical polarized elevation signal $\Delta_{VP})_{EL}$. The A and B vertical polarized difference signals are summed in magic-tee 8 with respect to the C and D vertically polarized difference signals to provide a vertically polarized azimuth signal $\Delta_{VP_{AZ}}$. The output port 25 of magic-tee 8 may be loaded with an impedance $Z_1$ to minimize mismatch. An identical circuit arrangement utilizing magic-tee sections 52, 53, 54 and 55 is provided for the horizontally polarized wave, the outputs of which are a summation signal for the horizontally polarized waves, a $\Delta$ difference signal for the vertically polarized wave in elevation and a $\Delta$ horizontal polarized wave for the difference signal in azimuth.

Figure 4:
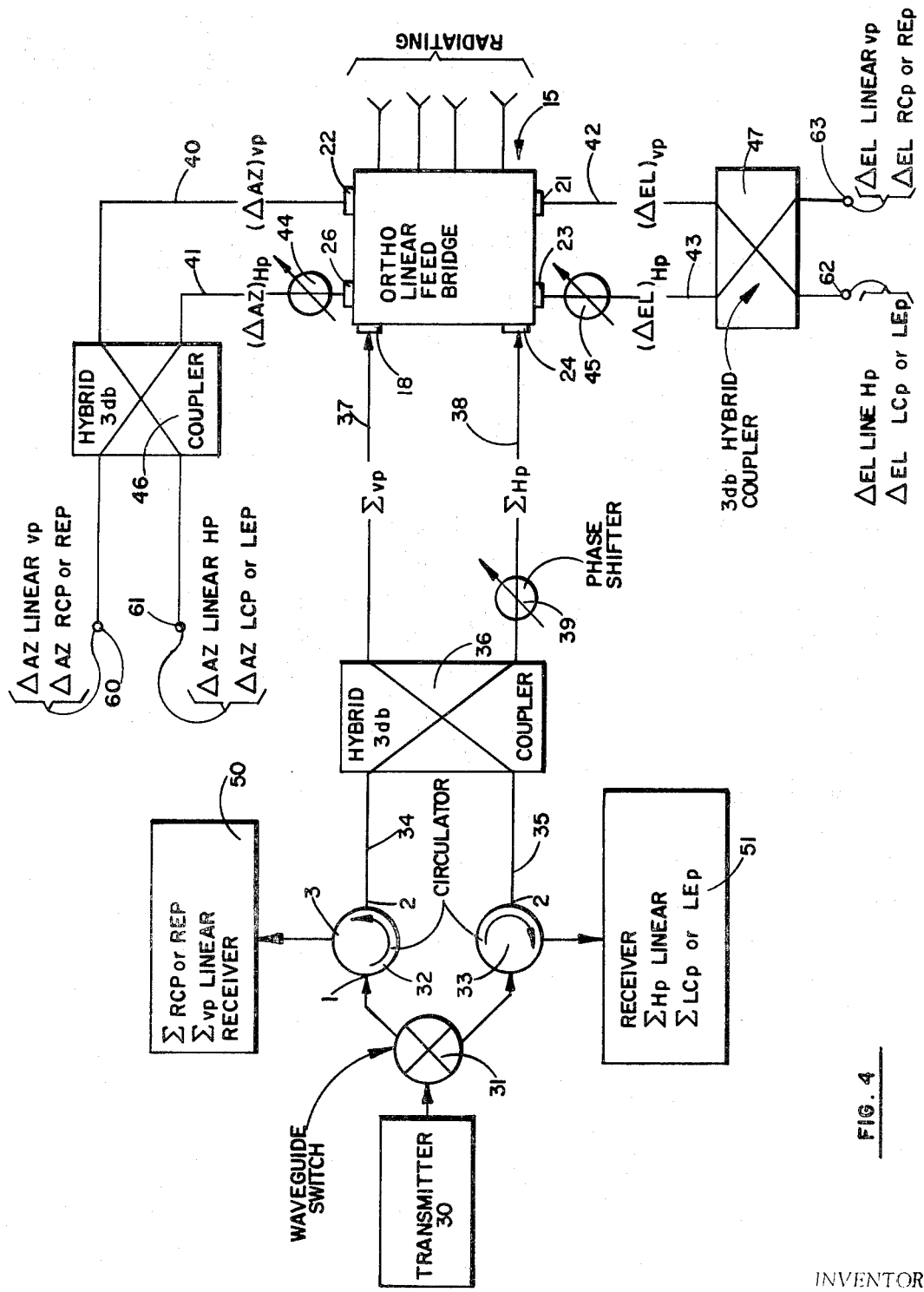
FIG. 4 is a block schematic diagram of a variable polarization full monopulse system utilizing the feed bridge of the preceding FIGS.

Referring to FIG. 4 wherein the ortholinear feed bridge 15 of FIG. 2 is incorporated into a radar system with variable polarization a standard microwave transmitter 30 provides microwave energy to a waveguide switch 31 which in turn directs the energy to either circulator 32 or 33. Each circulator has three ports labeled 1, 2 and 3. Port 1 is connected to the waveguide switch 31. Port 2 of circulator 32 is connected to waveguide 34 with port 2 of circulator 33 connected to waveguide 35. Port 3 of circulator 32 is connected to a receiver 50 with port 3 of circulator 33 connected to a receiver 51. Circulators 32 and 33 are multiport, nonreciprocal, or unidirectional microwave commutators which provided a match impedance between adjacent ports to signals transported in the direction indicated by the curved or circularly-shaped arrows. For example, with the circulator 32, signals may flow from the transmitter 30 to the first port 1 and then out the second port 2 to the transmission line 34 without significant attenuation. However, such applied signals will not be transmitted from the transmitter 30 to the receiver attached to port 3 without substantial attenuation. Similarly, an input signal applied to port 2 will appear substantially unattenuated at the third port 3, but will not be transmitted to port 1.

Microwave circulators 32 and 33 are similarly constructed and arranged, preferably being of the ferrite-type and similar; for example, to model CX–405 manufactured by Rantec, Inc. of Calabasas, Calif. A 3db hybrid coupler 36 is coupled to waveguides 34 and 35. The hybrid coupler receives microwave energy from either waveguide 34 or 35 and equally splits the energy, feeding one-half to waveguide 37 and the other half to waveguide 38. Interposed in waveguide 38 is a variable phase shifter 39 which controllably adjusts the phase of the microwave energy in waveguide 38. Waveguide 37 is coupled to the waveguide 18 shown in FIG. 2A; and waveguide 38 is coupled to waveguide 24 shown in the same FIG.

A 3db hybrid coupler 46 is connected to waveguides 22 and 26 of the ortholinear feed bridge 15 by means of waveguides 40 and 41 respectively. Interposed in the path of waveguide 41 is a variable phase shifter 44 for shifting the phase of the ($\Delta_{HP})_{AZ}$ signal a controlled amount. One output terminal of the coupler 46 is fed to terminal 60 and the other is fed to terminal 61.

Another 3db hybrid coupler 47 is connected to waveguides 21 and 23 of the ortholinear feed bridge 15 by means of waveguides 42 and 43, respectively. A variable phase shifter 45 is interposed in the path of waveguide 43 for shifting the phase of the $(\Delta_{Hp})_{EL}$ signal a controlled amount. One output terminal of the coupler 47 is fed to terminal 63 and the other to terminal 62.

TRANSMITTED WAVE

In operation, a signal $E_o$ is transmitted to waveguide switch 31 which directs the signal through the circulator 32 to the waveguide 34. The signal passes through the coupler 36 and emerges at waveguides 37 and 38 as:

$$E_{37} = \frac{E_o}{\sqrt{2}} e^{-j\frac{\pi}{4}} \quad (1)$$

$$E_{38} = \frac{E_o}{\sqrt{2}} e^{-j\frac{3\pi}{4}} \quad (2)$$

where the subscript represents the position or station of the signal. At the input to the sum channels of the feed bridge $E_{(38)}$ passes by the phase shifter 39, the signal at the input of the sum channel at terminal 24 is:

$E_{(\Sigma vp)} = E_{(37)}$ (3)
$E_{(\Sigma hp)} = E_{(38)} e^{-j\Phi}$ (4)

From each of the sum channel input waveguides 37 and 38, the signal goes through the ortholinear full monpulse feed bridge. If the ortholinear channels are both phase and amplitude tracked, the signal radiated into free space is:
$\vec{E}_{(Radiated)} = \vec{E}_{(\Sigma vp)} + \vec{E}_{(\Sigma hp)}$ (5)
using the coordinate system shown in FIG. 5
$\vec{E}_{(\Sigma hp)} = \vec{E}_x a_x$ (6)
$\vec{E}_{(\Sigma vp)} = \vec{E}_y a_y$ (7)
then the radiated electric field can be written as $$E_{(RADIATED)} = \frac{E_o}{\sqrt{2}} e^{-j\frac{\pi}{4}}\left[ \vec{a_x} e^{-j\left(\frac{\pi}{2}+\phi\right)} + \vec{a_y} \right] \quad (8)$$

Thus, equation (8) is a representative wave of any polarization state. Referring to equations (6) and (7), it can be shown from these two equations that the polarization state depends upon the relative amplitude and phase of the two linear orthogonal polarized waves as represented by equation (8): when the amplitude of $E_x$ equals $E_y$ and the phase difference between them is $\pm \pi/2$, then the radiated energy as represented by equation (8) is circularly polarized. The $\pm$ sign designates the sense of polarization, i.e., left-hand polarization (L.C.P.) or right-hand polarization (R.C.P.). When the relative amplitudes and/or phase of the two linear orthogonal polarized waves are unequal, the plane wave is elliptically polarized. When the relative amplitude is unequal but the phase is equal, equation (8) represents a linear polarized wave, with its polarization vector making an angle $\Theta$, where $$\theta = \tan^{-1}\frac{|E_y|}{|E_x|}$$

is derived from equation (8) using equalities of equations (5), (6) and (7). When either amplitude is zero, the radiated wave is linearly polarized in the x-direction or the y-direction. For a special case when $\Phi = 0$, the wave is a right-hand circular polarized wave propagated in the z-direction as indicated in FIG. 6A.

REFLECTED WAVE

A circular polarized antenna will respond to an even bounce target signal and reject odd bounce target signals. To verify this, we can trace the return signal through the feed bridge for both an even bounce and an odd bounce target. The radiated field is $$E_{(Radiated)} = \frac{E_o}{\sqrt{2}} e^{-j\frac{\pi}{4}}\left( \vec{a_x} e^{-j\frac{\pi}{2}} + \vec{a_y} \right) \quad (9)$$

Let: $E_x = \frac{E_o}{\sqrt{2}} e^{-j\frac{\pi}{2}} \vec{a_x}$, and $E_y = \frac{E_o}{\sqrt{2}} \vec{a_y}$ From the polarization diagram FIGS. 6B we can immediately write down the electric field for the reflected wave of an odd bounce target:

$$E_{(Ref)} = \frac{-E_o}{\sqrt{2}} e^{-j\frac{\pi}{4}}\left( e^{-j\frac{\pi}{2}} \vec{a_x} + \vec{a_y} \right) \quad (10)$$

$$E_{(38)} = \frac{-E_o}{\sqrt{2}} e^{-j\frac{3\pi}{4}} \quad (11)$$

$$E_{(37)} = \frac{-E_o}{\sqrt{2}} e^{-j\frac{\pi}{4}} \quad (12)$$

$$E_{(34)} = \left[\frac{E_{(37)}}{\sqrt{2}} e^{-j\frac{\pi}{4}} + \frac{E_{(38)}}{\sqrt{2}} e^{-j\frac{3\pi}{4}}\right] \quad (13)$$

$$E_{(34)} = \frac{-E_o}{2}\left[e^{-j\frac{\pi}{2}} + e^{-j\frac{3\pi}{2}}\right] \quad (14)$$

$$E_{(34)} = 0 \quad (15)$$

$$E_{(35)} = \frac{E_{(37)}}{\sqrt{2}} e^{-j\frac{3\pi}{4}} + \frac{E_{(38)}}{\sqrt{2}} e^{-j\frac{\pi}{4}} \quad (16)$$

$$E_{(35)} = \frac{-E_o}{2}[e^{-j\pi} + e^{-j\pi}] \quad (17)$$

$$E_{(35)} = E_o \quad (18)$$

Thus, for odd bounce targets no return signal is received by the sum port 34, and all return signals are received by port 35.

For an even bounce target with the polarization diagram shown in FIG. 6C.

$$E_{(Ref.)} = \frac{E_o}{\sqrt{2}} e^{-j\frac{\pi}{4}}\left( -e^{-j\frac{\pi}{2}} \vec{a_x} + \vec{a_y} \right) \quad (19)$$

$$E_{(38)} = \frac{-E_o}{\sqrt{2}} e^{-\frac{j3\pi}{4}} \quad (20)$$

$$E_{(37)} = \frac{E_o}{\sqrt{2}} e^{-\frac{j\pi}{4}} \quad (21)$$

$$E_{(34)}\left[ = \frac{E_{(37)}}{\sqrt{2}} e^{-\frac{j\pi}{4}} + \frac{E_{(38)}}{\sqrt{2}} e^{-\frac{j3\pi}{4}}\right] \quad (22)$$

$$E_{(34)} = \frac{E_o}{2}\left[e^{-j\frac{\pi}{2}} - e^{-j\frac{3\pi}{2}}\right] \quad (23)$$

$$E_{(34)} = E_o e^{-j\frac{\pi}{2}} \quad (24)$$

$$E_{(35)} = \left[\frac{E_{(37)}}{\sqrt{2}} e^{-j\frac{3\pi}{4}} + \frac{E_{(38)}}{\sqrt{2}} e^{-j\frac{\pi}{4}}\right] \quad (25)$$

$$E_{(35)} = \frac{E_o}{2}[e^{-j\pi} - e^{-j\pi}] \quad (26)$$

$$E_{(35)} = 0 \quad (27)$$

Thus, for even bounce targets all return signals are received by the sum port, port 34, and no signal is received by port 35.

Similarly, if we trace the return signal through the different channels, we will find that ports 60 and 63 will receive even bounce target signals, ports 61 and 62 will receive odd bounce target signals.

TRANSMITTED AND RECEIVED UNCOUPLED SIGNAL

The variable polarization full monopulse bridge, shown in the preceeding FIGS., does not transmit one linear polarization and receive both ortholinear polarization, which are uncoupled. In order to transmit only one linear polarization and receive both ortholinear polarization that are uncoupled, it is necessary to replace the 3db hybrid couplers 36, 46 and 47 with 3db hybrid switches.

A 3db hybrid switch consists of a sidewall 3db hybrid coupler with a variable short circuit in its common wall slot. A schematic diagram of a 3db hybrid switch is illustrated in FIGS. 7A and 7B.

Figure 7A:
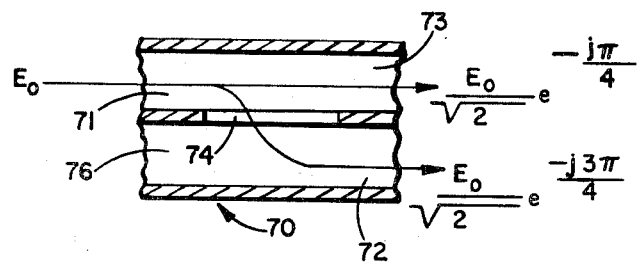
FIGS. 7A and 7B illustrate in schematic form the operation of a 3db hybrid switch which may be used with the invention.
Figure 7B:
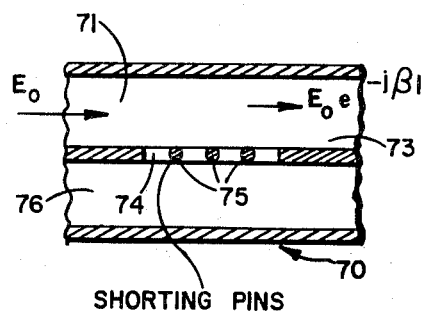

In FIG. 7A, the 3db switch 70 is in the open position allowing one-half of the energy received at the input port 71 to be channeled through the coupling slot 74 to the port 72, while the other half proceeds straight through to port 73. In FIG. 7B, shorting-pins 75 are positioned in the coupling slot 74 to act as an electrical short, thereby directing all of the energy at port 71 to port 73. The above sequence of events is identical for a signal applied to port 76. A device that can be used as a 3db switch is more completely disclosed in FIG. 10 and the associated description thereof in U.S. Pat. No. 3,274,602 entitled Antenna Having Variable Beam Width Achieved By Variation Of Source Width by G. M. Randall et al., assigned to North American Aviation, the assignee of the present invention.

The substitution of the hybrid switch for the hybrid coupler expands the available functions to transmitting and receiving of both ortholinear polarizations.

While there has been shown what are considered to be the preferred embodiments of the present invention, it will be manifest that many changes and modifications may be made therein without departing from the essential spirit of the invention. It is intended, therefore, in the annexed claims, to cover all such changes and modifications as fall within the true scope of the invention.

I claim:

1. A dual-plane monopulse feed bridge for receiving and transmitting selected polarizations comprising in combination:
   a. a pair of linear polarization monopulse sum ports, the linear polarizations of which being mutually orthogonal;
   b. a first pair of linear polarization monopulse difference receiving ports, the linear polarizations being mutually orthogonal in the same manner as said sum ports, said difference ports being operative in a common first responsive plane of said dual plane bridge;
   c. a second pair of linear polarization monopulse difference receiving ports, the linear polarizations of which being mutually orthogonal in the same manner as said sum ports, said second pair of difference ports being operative in a common second responsive plane of said dual-plane bridge, said second plane being orthogonal to said first plane; and
   d. variable phase shift means inserted in circuit with one port of each of said pairs of ports for controllably varying the phase of the transmitted and received signals.

2. The invention according to claim 1 and further comprising a coupler means for coupling each port to the other port of a pair and for dividing a portion of the energy therebetween.

3. The invention according to claim 1 and further comprising a switch means for controllably coupling each port to the other port of a pair and for dividing a portion of the energy therebetween.

4. The device of claim 1 in which there is further provided first, second and third signal combining means, each responsive to a first and phase-shifted second output of a respective pair of said port pairs for providing monopulse outputs of selected polarization condition.

5. The invention according to claim 4 wherein said signal combining means are 3db, hybrid couplers.

6. The invention according to claim 4 wherein said signal combining means are 3db, hybrid switches.

7. The invention according to claim 4 and further comprising:
   a. a pair of circulator means connected one to each of said pair of mutually orthogonal sum ports;
   b. a source of microwave energy;
   c. a waveguide switch controllably connecting said source of microwave energy to said mutually orthogonal sum ports; and
   d. receiver means connected to said circulator means for controlled connection to said pair of mutually orthogonal sum ports.

8. A dual-plane monopulse feed bridge for receiving and transmitting selected polarizations comprising in combination:
   a. an array of at least four orthomode transducers, each of said transducers comprised of a square waveguide section and two rectangular waveguide sections, said rectangular waveguide sections connected in circuit to said square waveguide section with said rectangular waveguide sections orthogonal to each other;
   b. dual-plane monopulse means responsive to said orthomode transducers for providing a first and second dual-plane monopulse output set of mutually orthogonal linear polarization;
   c. means responsive to said monopulse means for combining like monopulse signals of said mutually orthogonal linearly polarized output sets; and
   d. means for variably shifting the phase of each monopulse output of one of said dual-plane monopulse output sets.